April 8, 1969 C. E. BAKER ETAL 3,437,393

TORSIONAL VIBRATOR LIGHT BEAM SCANNER

Filed Sept. 30, 1966

INVENTORS:
CHARLES E. BAKER
WILLIAM D. PENN

ATTORNEY

INVENTORS:
CHARLES E. BAKER
WILLIAM D. PENN

ATTORNEY

United States Patent Office 3,437,393
Patented Apr. 8, 1969

---

3,437,393
TORSIONAL VIBRATOR LIGHT BEAM SCANNER
Charles E. Baker and William D. Penn, Dallas, Tex., assignors to Texas Instruments Incorporated, Dallas, Tex., a corporation of Delaware
Filed Sept. 30, 1966, Ser. No. 583,214
Int. Cl. G02b 17/00, 17/06
U.S. Cl. 350—6     13 Claims

---

ABSTRACT OF THE DISCLOSURE

Disclosed for use in a display system is a light beam scanner using torsional vibrators cooperatively to scan a modulated light beam. The modulated light beam impinges upon each of said torsional vibrators to form a predetermined pattern in said display system. Each of said vibrators comprises a cylindrical body with a toroidal coil thereon for magnetically biasing said body to induce torsional motion, a torsional amplifier extending from said body, and a reflector surface at the end of said torsional amplifier.

---

This invention relates to control of projection of a light beam and more particularly to use of torsional forces in positioning a mirror.

Laser light sources offer advantages not found in conventional light sources. Significant and distinguishing properties are high intensity, spatial coherence, monochromaticity, and polarization. Some of these features may be more important than others depending upon the application. For example, the high intensity of laser light, together with the spatial coherence, removes the necessity of using larger aperture optics for efficient energy transfer. By way of illustration, only a few percent of the light from a tungsten filament may be used in a conventional transparency projector. In contrast, essentially all the light from a laser is usable. Several available scanning and light modulation techniques make use of the laser spectral purity and/or the linear polarization of its output.

In accordance with the present invention, there is provided a system for projecting a static light beam to form a predetermined scan through a fiber optic scan converter requiring at its input a closed two dimensional traverse of the light beam and a linear output.

A first reflector structure is positioned in the beam and includes a first mirror surface and a torsional vibrator which is symmetrical to a first axis oriented such that a plane perpendicular to the axis is at an angle to the plane of the first surface. A second reflector structure is positioned in the beam as reflected from the first surface. It includes a second mirror surface and a second torsional vibrator which has symmetry to a second axis oriented at an angle to the first axis and is such that a plane perpendicular to the second axis is at an angle to the second reflecting surface to direct light from the second reflecting surface onto the closed path converter input. Means are then provided for driving the torsional vibrators with time varying, phase spaced, electrical functions to drive the beam reflected from the second surface in a trajectory which corresponds with the closed path. Preferably, the closed loop is circular, the electrical functions are sinusoidal, and are spaced in phase by 90°. Further, each vibrator preferably includes a magnetostrictive cylindrical member supported as to have one end free with a torsionally resonant amplitude transformer extending from the other end to support the reflecting surface.

Figure 1:
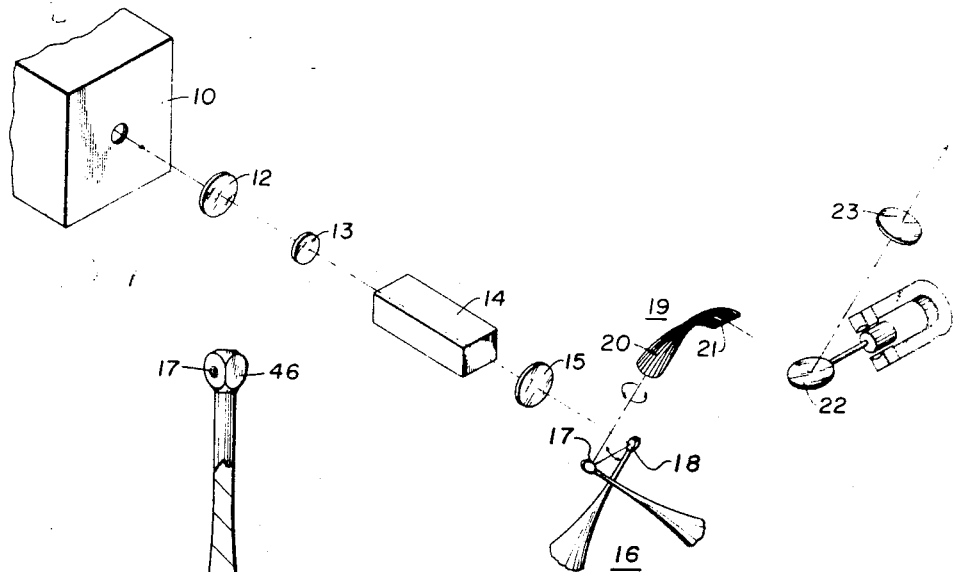
Figure 3:
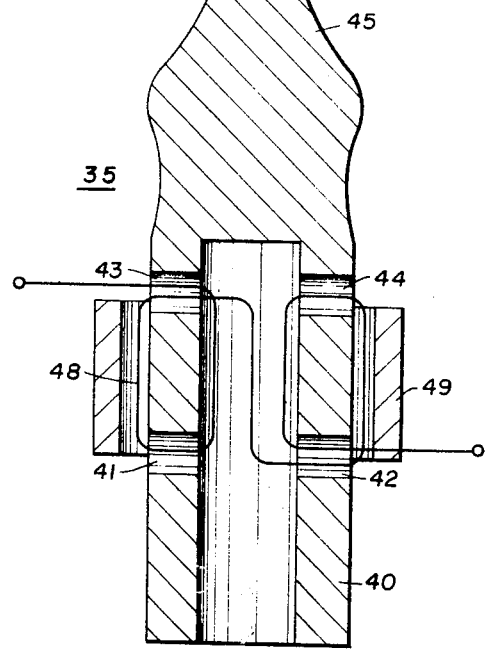
Figure 2:
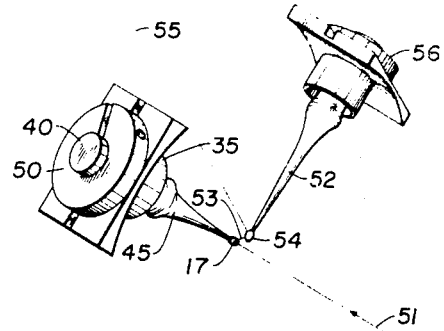
Figure 4:
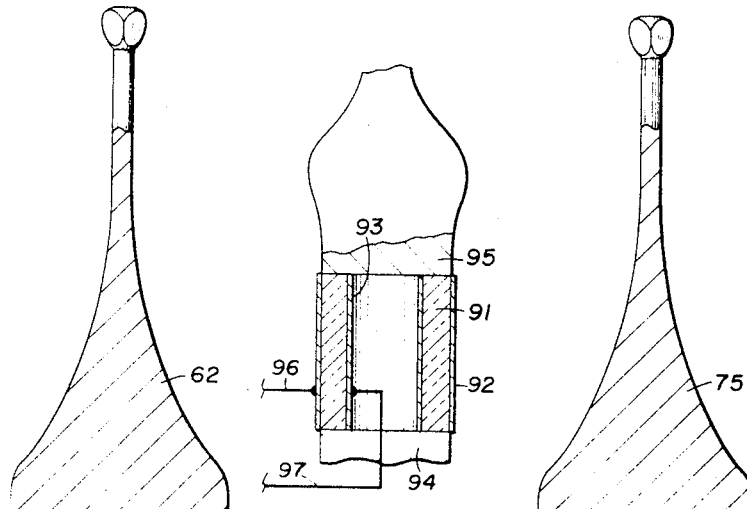
Figure 5:
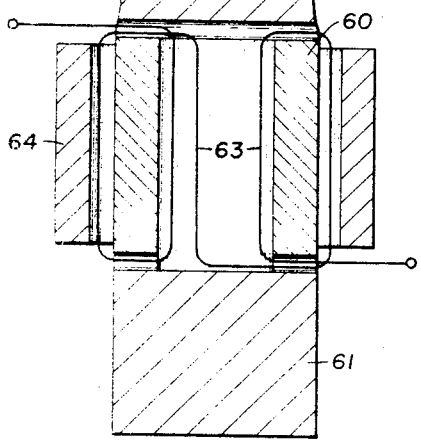
Figure 6:
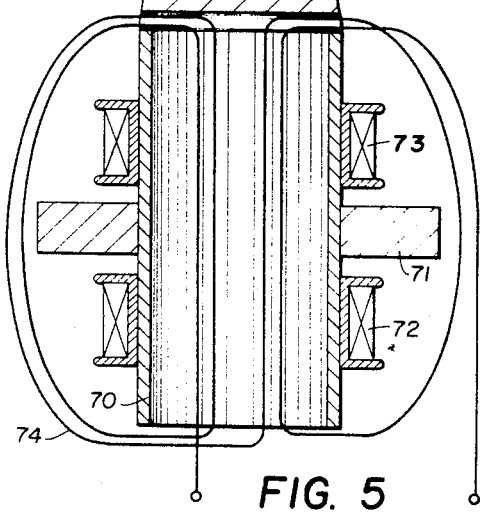
Figure 7:
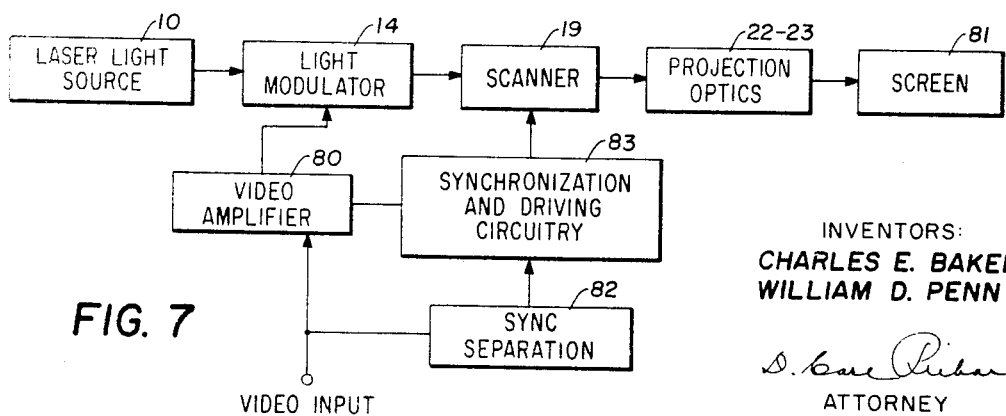

For a more complete understanding of the present invention and for further objects and advantages thereof, reference may now be had to the following description taken in conjunction with the accompanying drawings in which:

FIGURE 1 is a functional layout of a laser display system embodying the invention;
FIGURE 2 illustrates the deflector of the present invention;
FIGURE 3 is a sectional view of one deflection element;
FIGURE 4 illustrates a modification of the element of FIGURE 3;
FIGURE 5 illustrates a further modification of the invention;
FIGURE 6 illustrates a torsional piezoelectric transducer; and
FIGURE 7 is a functional block diagram of a display system.

Referring now to FIGURE 1, a laser display system is illustrated which is adapted for the display of a commercially produced television picture. The horizontal and vertical scan rates may be the same as those used in conventional television operations. Such identity of scan rates is not a necessary feature of the invention. However, it is noted that TV displays normally have 525 active vertical lines. In contrast, vertical and horizontal resolution in excess of 1000 lines and beyond is possible with the present invention.

Referring again to FIGURE 1, a layout of a laser display system is shown. The laser 10 operates in a geometry such that all the output is generated in a single spatial mode. This allows a diffraction-limited optical system to be used and assures maximum resolution with a limited optical aperture. The lens 12 is used to diverge the light emitted from the laser 10. The light is collimated through lens 13, projected through the modulator 14 and polarizer 15 onto mirrors 17 and 18 which are parts of the horizontal scanner 16. Because of the motion of the mirrors 17 and 18, the modulated light beam is reflected in a circular pattern onto end 20 of a fiber optic converter 19.

The horizontal scanner 16 generates a lissajous pattern at the desired horizontal line rate. This is accomplished by rotating mirrors 17 and 18 on two angularly spaced axes with predetermined relative motion. Preferably the axes are mutually perpendicular to each other and to the incident beam and are driven sinusoidally at a given frequency but 90° out of phase. In such preferred arrangement, the resultant circular scan pattern is then rectified by the converter 19 into a linear scan with near zero flyback time. This is accomplished since the light beam is projected from mirror 18 onto the circular end 20 of the fiber optics in converter 19. The light beam travels through the fibers and is projected out of the end 21 onto an oscillating mirror 22. In passing through the converter 19, the light beam is scattered and emerges as a cone of light. Because of this scattering, the scanner mirror 22 must be considerably larger and turn through a larger angle than the horizontal scanner.

A d'arsenval type galvanometer may be used to produce the vertical scan. The reflection from the mirror 22 is projected through projection lens 23 onto a suitable receiving screen (not shown).

A preferred form of driver element is shown in FIGURE 3 where the driver 35 for the mirror 17 is illustrated. An identical driver will be used for mirror 18. The driver 35 is made of magnetostrictive material preferably having a constant temperature modulus. Driver 35 has a hollow cylindrical base 40 which has a first transverse bore forming apertures 41 and 42 and a second transverse bore forming apertures 43 and 44. Driver 35 also includes a torsionally resonant amplitude transformer 45 integrally formed with the base 40 and having a three-faceted sphere 46 on which the mirror 17 is mounted or formed. The transformer 45 is a minaret-shaped body with a needle-like end with a flat surface for the side mount of a mirror. The transformer amplifies torsional motion transferred to the base of the transformer 45 by a actuation of the base 40.

A toroidal coil 48 is wound onto the base 40 with the winding threaded through the apertures 41–44. Upon energization of coil 48 by a sinusoidal alternating current, torsional vibration is set up in the base 40. The vibration is mechanically amplified by the transformer 45. As a result, relatively large angle reflections of the beam of light striking the mirror 17 are produced. As above noted, it is preferred that the driver axes be oriented at 90° from one another and at an obtuse angle (preferably about 90°) relative to the incident light beam. However, many other configurations are possible. For example, angles of 30° between the driver axes and the incident beam and the first mirror would be workable. In such case, the amplitude and phase of the driving voltages for the two drivers would be adjusted such as to produce the desired pattern in the output beam.

A magnet 49 provides a magnetic bias to the base 40. A suitable material for the driver 35 is Ni-Span C, a well-known stainless steel alloy of nickel, chromium, iron and titanium.

Nickel is the most commonly used magnetostrictive material. Certain nickel alloys make better magnetostrictive vibrators than does nickel. Magnetostrictive ferrites are used at high frequencies because of their low eddy current losses.

Important in evaluating and selecting magnetostrictive materials for a given purpose is the electromechanical coupling coefficient $k$:

$$k^2 = \frac{4\pi\lambda^2\mu_r}{E}$$

where:

$\lambda$ = magnetostrictive constant, dyne/cm.$^2$/gauss;
$\mu$ = reversible permeability; and
$E$ = Young's modulus.

The product $\lambda^2\mu_r$ determines the effectiveness of the vibrator, since E does not vary greatly for any of the magnetostrictive materials. The effective coupling coefficient can be determined from motional impedance measurements or impedometer methods.

The principal source of loss in magnetostrictive vibrators is due to eddy currents. Consequently, the material used must be laminated or, in the case of hollow tubes, thin-walled in order to reduce these losses. Thicknesses of 4 to 10 mils are ordinarily used in the low kilocycle range.

As above noted, magnetostrictive transducers are used with a polarizing bias. This bias can be obtained from permanent magnets, from a polarizing winding, or by utilizing the remanent polarization of the material. For best results, the polarizing bias must be optimized. If a polarizing winding is used, the D.C. current is adjusted for best results with the peak field due to the signal at a value less than the polarizing field.

The strain in the material will be in the direction of the resultant field due to the polarizing and signal fields. For torsional vibration these two fields, must be orthogonal. Hence, for a hollow tube, the polarizing field must be circumferential and the signal field axial or vice versa. A circumferential field may be obtained by passing a wire carrying the polarizing current through the center of the tube or by winding a coil toroidally around the tube. The signal coil would then be wound around the tube axis.

Driver 35 of FIGURE 3 is illustrated as being formed of a unitary body of magnetostrictive material. The transformer 45 is shown as a solid member, with the tip shaped to form three flat surfaces. The mirror 17 may be formed by polishing one of such surfaces or by securing a mirror element to such surface. The transformer 45 is shaped in accordance with known design criteria, and thus forms a resonant body having two strain-free surfaces, on one of which the amplitude of vibration is bigger than on the other. Such transformers are described in the Journal of the Acoustical Society of America, volume 36, No. 1, pages 1–9, January 1964, in an article by Eisner entitled "Torsionally Resonant Amplitude Transformers for High Magnification."

Referring again to FIGURE 2, driver 35 for mirror 17 is illustrated with its base 40 secured in a clamp 50, with the axis of the driver 35 substantially at right angles to an incident laser light beam 51. The second driver 52, carrying mirror 18, is mounted with its axis at 90° to the axis of driver 35. The light beam 53 reflected from mirror 17 impinges mirror 18 mounted on the shaped end 54 of driver 52 so that the reflected beam 55 will be projected to the utilization elements of the system. With the drivers 35 and 52 mounted with their axes at right angles, current of 90° phase difference, sinusoidal in shape, and equal in magnitude, may be applied to the excitation coils on the drivers 35 and 52. As a result, the motion of the light beam 55 will be circular.

The driver 52 is illustrated with its base secured in clamp 56. Clamps 50 and 56 are secured to suitable frame members (not shown).

FIGURE 4 illustrates a modification of the driver shown in FIGURE 3. In this modification, a magnetostrictive cylinder 60 is secured by a suitable adhesive to a cylindrical base 61. At the other end, the cylinder 60 is secured to a transformer 62. Suitable cementitious material may be employed to secure the cylinder 60 to the base 61 and the transformer 62. The base 61 has a transfer slot therein as does the bottom of the transformer 62 so that the coil 63 may be disposed in a toroidal sense around the magnetostrictive cylinder 60.

A cylindrical magnet 64 encircles the cylinder 60 such that the magnetic lines of force will pass through the cylinder 60 and bias the same.

By way of example, one embodiment of the unit of FIGURE 4 operated at a frequency of 28,350 cycles per second. In this unit, the transformer 62 was torsionally resonant with an amplification of 3000 (theoretical). It was a Fourier transformer 2.68 inches long and had a three-faceted sphere of 0.170 inch diameter on the end thereof. Three different materials identified below were used: (i) Elenvar Extra, manufactured and sold by Allied Products Division of Hamilton Watch Co., Lancaster, Pa.; (ii) Iso Elastic, manufactured and sold by John Chatillon & Son, New York N.Y.; and (iii) Ni-Span C, manufactured and sold by Huntington Allied Products Division of International Nickel Corp., Huntington, W. Va.

The transducer 60 was made of N-51 Magnetostrictive Ferrite, manufactured and sold by Ceva Magnetics, Inc., of Clifton, N.J. The outside diameter was 1.0 inch with a wall thickness of ¼ inch and a length of 1.05 inches for quarter wavelength resonance.

Toroidal coil 63 comprised fifteen turns of #24 wire. The bias magnet was of Alnico 5, manufactured and sold by Indiana General Corp., of Valparaiso, Ind. A suitable magnet was 1½ inches outside diameter, 1⅛ inches inside diameter, and ¾ inch long with an energy product of $5.5 \times 10^6$ BH (max).

The base 61 was a cylinder of cold rolled steel 1.0 inch long and 1.0 inch in diameter. The transmitter 60 was secured to the transformer 62 and to the base 61 by means of a suitable silicone adhesive such as Dow-Corning Type 732 adhesive.

In FIGURE 5, a further modification of the invention has been illustrated wherein a thin walled nickel tube 70 is clamped at a midpoint by clamp 71. A pair of polarizing coils 72 and 73 are mounted coaxially on the tube 70 adjacent to opposite ends thereof and on opposite sides of the clamp 71. Coils 72 and 73 are energized to provide a magnetic bias on the nickel tube 70. A torodial polarizing winding 74 encircles the tube 70 to induce torsional vibration in the tube in a half wave mode.

One end of the tube 70 is secured to a torsionally resonant amplitude transformer 75. The end of the transformer 75 is, as in the other embodiments, designed to accommodate a mirror thereon.

The transformer 75 may be either solid or hollow, as is understood by those skilled in the art. However, for the purpose of illustration, it has been shown in solid form in the drawings herein.

It will further be understood that the polarizing windings 72 and 73 and the driver winding 74 may be interchanged in their function and still produce the desired torsional vibration in the nickel tube 70. However, in general, it is desired that the A.C. winding be the most efficient in its coupling to the nickel tube. For this purpose, it is preferred that the driver coil be the toroidal coil. The polarizing coils may then be solenoidal in form. However, operation is not limited to the preferred relationship.

In one magnetostrictive transducer of the type shown in FIGURE 5, the amplitude transformer was attached to nickel tubing having an outside diameter of 0.531 inch, wall thickness of about 0.031 inch, and the tubing was annealed for one hour at 600° C. after cutting to length.

Nickel has the following values:

$E = 21 \times 10^{11}$ dyne/cm.$^2$
$\mu = 80 \times 10^{10}$ dyne/cm.$^2$
$\sigma = 0.336$
$\rho = 8.8$ g./cm.$^3$.

Using these values, a 28,000 c.p.s. range scanner was constructed:

$$c_t = \sqrt{\frac{\mu}{\rho}} = \sqrt{\frac{80 \times 10^{10}}{8.8}} = 3.01 \times 10^5 \text{ cm./sec.}$$

and $$f_1 = \frac{c_t}{2l} \text{ or } l = \frac{c_t}{2f_1} = \frac{3.01 \times 10^5}{2 \times 28,350} = 5.3 \text{ cm.}$$

where:

$l = 5.3$ cm., or 2.09 inches, for torsional resonance at 28,350 c.p.s.

The signal coil consisted of 90 turns of #22 enamel wire wound in three layers of ½-inch length, and the polarizing coil was ten turns of #22 wire wound toroidally around the tube. The coils were loosely placed upon the nickel tube. The resonant frequency as determined by impedometer measurements was 28,870 c.p.s. The polarizing current for best results was about 5 amp.

A mirror was attached to the outer edge of the tube and the laser beam was adjusted so that the mirror reflection could be detected approximately 12 feet away. A deflection of about 1 inch was obtained at the resonant frequency of 27,870 c.p.s. with 22 volts applied to the coil. This deflection corresponds to about 0.007 radian. A 14-degree deflection was achieved by mounting the Fourier transformer on the end of the nickel tube.

Thus, large deflections are obtained while using relatively large mirrors with independent control over X and Y axes, thus making it possible for feedback control to be used.

It is to be noted that while magnetostrictive drivers have been shown in the drawings, it is possible to employ torsionally operated piezoelectric drivers in the relationships illustrated in FIGURE 2.

More particularly, as shown in FIGURE 6, a piezoelectric transducer 91 in tubular form is circularly polarized. A thin cylindrical electrode 92 is applied on the outer surface. A thin electrode 93 covers the inner surface. One end of transducer 91 is secured to a base 94. The other end is coupled to a transformer 95. The application of suitable driving voltages to conductors 96 and 97 will produce torsional vibration. The transducer 91 may be a piezoelectric body of the type manufactured and sold by the Clevite Corporation of Cleveland, Ohio, and identified as a PZT-4 transducer. With such a body circularly polarized, the application of voltages between the inner and outer electrodes will produce a twisting motion therein. It will be understood that the transducer may be mounted on base 94 when operated in a quarter wave mode. Alternatively, it may be clamped at the center, as in FIGURE 5, for operation in a half wave mode.

FIGURE 7 is a block diagram of the laser display system. A light beam generated within the laser 10 is modulated by modulator 14. The modulator is driven by a video amplifier 80 which amplifies the video input signal to a level suitable for acting upon the modulator 14. The modulated light beam is then transformed into horizontal segments by the scanner 19 and projected by the projection optics 22–23 onto a screen 81. The video input signal includes a synchronization pulse which is used in synchronizing the horizontal and vertical scanners. The sync pulse is separated from the video signal by the sync separation circuitry 82 and applied to the synchronization and driving circuitry 83. Responsive to the signal from the synchronization and driving circuitry, the horizontal and vertical scanners operate synchronously to change the modulated light beam into modulated line segments which are combined to form a display.

Since the laser beam is monochromatic, the use of a single laser will produce a projection in one color. The neon-helium gas laser produces a ruby red light, as does the krypton laser. Blue and green lights may be produced by an argon laser. Full color displays are possible by combining the output of three lasers: a neon-helium or krypton laser producing a red light, and two different argon lasers producing blue and green light, the combination of the three producing white light or any color combination thereof.

A laser suitable for use in connection with this invention to produce a display is a 50 milliwatt helium-neon gas laser model 125 manufactured and sold by Spectra-Physics, Mountain View, Calif. In this laser, the resonator mirrors and plasma tube are mounted on a rigid structure with suitable adjustments to allow easy alignment. Radio frequency excitation is used in addition to D.C. excitation to increase the power output. The hemispherical resonator operates in the uniphase or TEM mode. Other modes are discriminated against by proper mirror orientation. All the power is taken out of the spherical end by using a flat mirror on the opposite end with an extremely high reflectivity. The power output of this laser is not necessarily a limiting factor; however, the larger the projection and the greater the intensity, the greater the power the laser should produce.

Light modulator 14, FIGURES 1 and 7, may be formed by two matched pieces of 45° Z-cut potassium dihydrogen phosphate (KDP) oriented at a 90° angle. Such matched units are employed for temperature compensation. An electric field transverse to the direction of the laser beam is varied to change the light transmission. Such a modulator is disclosed in patent application Serial No. 371,053, filed May 28, 1964, and assigned to the same assignee as the present invention. A modulator of this type can be operated at 75% modulation efficiency over a 5 megacycle bandwidth with 250 v. peak voltage with a contrast of greater than 100 to 1. In the operation of modulator 14, the collimated polarized light from the laser passes down the axis of the modulator crystal. The electric field applied to the modulator produces elliptical polarization of the emerging light.

From the foregoing, it will be seen that there is provided a system for projecting a light beam to form a predetermined scan through fiber optic scan converter having a closed loop input and a linear output. A first reflector structure is provided in the beam and includes a reflection surface and a torsional vibrator symmetrical to a first axis. A second reflector structure is provided in the beam as reflected from the first reflection surface and includes a second reflection surface on a torsional vibrator symmetrical to a second axis oriented at an angle to the first axis and to the beam reflected from the first reflection surface. Means are then provided for driving the torsional vibrators with related time varying electrical functions to drive the beam reflected from the second reflection surface in a closed trajectory of predetermined shape.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a system for projecting a coherent light beam to form a predetermined pattern, the combination which comprises:
   (a) a first resonant torsional vibrator comprising a first member driven in a torsional vibration mode and a first torsional amplifier extending from said first member,
   (b) a second resonant torsional vibrator comprising a second member driven in a torsional vibration mode and a second torsional amplifier extending from said second member,
   (c) means for driving said first and second torsional vibrators in a torsional vibration mode with time varying phase spaced electrical signals,
   (d) a first reflector surface on said first torsional amplifier, positioned in the path of said light beam and driven about a first axis by said first resonant torsional vibrator,
   (e) a second reflector surface on said second torsional amplifier, positioned in the path of the light beam reflected from said reflector and driven about a second axis by said second resonant torsional amplifier,
   whereby said light beam, after being reflected by said first and second reflector surfaces, forms said predetermined pattern.

2. The combination set forth in claim 1 wherein:
   (a) said electrical signals are sinusoidal, and
   (b) said sinusoidal signals differ in phase by 90°.

3. The combination set forth in claim 1 wherein each said resonant torsional vibrator further comprises means for supporting each of said members.

4. The combination set forth in claim 3 wherein each of said first and second members is a magnetostrictive cylinder with means coupled thereto for applying a unidirectional magnetic bias and means for applying alternating current vibration generating excitation thereto.

5. The combination set forth in claim 1 wherein each said first and second members comprises a hollow cylindrical magnetostrictive body with a toroidal coil thereon, and with means for applying a magnetic bias thereto, and wherein a base is secured to each of said cylinders.

6. In a system where a light beam is to be dynamically controlled as to position, the combination which comprises:
   (a) a member driven in a torsional vibration mode,
   (b) means to apply energy from an alternating current source for inducing torsional vibration in said member,
   (c) a mechanically resonant transformer extending from said member, amplifying the torsional vibration of said member; and
   (d) structure at the end of said transformer forming a light reflecting surface positioned in said beam.

7. The combination set forth in claim 6 wherein said member is a biased magnetostrictive cylinder and said energy from said source is applied to said cylinder by way of a toroidal winding thereon.

8. The combination set forth in claim 6 further including means for supporting said member at the end of said member opposite said amplifier.

9. The combination set forth in claim 6 wherein said member is clamped by the supporting means at a midpoint of said member and said energy from said source is of frequency to drive said member in a half wave mode.

10. The combination set forth in claim 6 wherein said cylindrical member is a torsional piezoelectric transducer.

11. A scanning system comprising:
   (a) a coherent light source,
   (b) a modulator optically aligned with said coherent light source,
   (c) optical divergent and collimating means between and optically aligned with said modulator and said light source,
   (d) a first resonant torsional vibrator comprising a first member driven in a torsional vibration mode and a first torsional amplifier extending from said first member,
   (e) a second resonant torsional vibrator comprising a second member driven in a torsional vibration mode and a second torsional amplifier extending from said second member,
   (f) means for driving said first and second torsional vibrators in a torsional vibration mode with time varying phase spaced electrical signals,
   (g) a first reflector surface on said first torsional amplifier, positioned in the path of said light beam and driven about a first axis by said first resonant torsional vibrator,
   (h) a second reflector surface on said second torsional amplifier, positioned in the path of the light beam reflected from said first mirror surface and driven about a second axis by said second resonant torsional amplifier,
   (i) a scan converter aligned with said torsional vibrators,
   whereby said light beam, after being reflected by said first and second reflector surfaces, impinges upon said scan converter.

12. The combination set forth in claim 1 further including light modulating means.

13. The combination set forth in claim 1 where said second axis is not parallel to said first axis.

References Cited

UNITED STATES PATENTS

| | | | |
|---|---|---|---|
| Re. 21,806 | 5/1941 | Johnson | 250—232 |
| 1,438,974 | 12/1922 | Wente | 324—97 |
| 1,713,179 | 5/1929 | Hall | 324—97 |
| 1,725,710 | 8/1929 | Hammond | 324—97 |
| 1,756,232 | 4/1930 | Arnaud | 178—7.6 |
| 1,951,666 | 3/1934 | Martin | 250—232 |
| 2,002,678 | 5/1935 | Ross | 324—97 X |
| 2,920,529 | 1/1960 | Blythe | 324—97 X |
| 3,036,153 | 5/1962 | Day | 178—7.6 X |
| 3,154,371 | 10/1964 | Johnson | 350—7 X |
| 1,766,885 | 6/1930 | Dauvillier | 350—235 X |
| 1,839,706 | 1/1932 | Silberstein | 178—7.6 |
| 2,090,853 | 8/1937 | Priess | 178—7.6 |
| 3,146,367 | 8/1964 | McIlvaney | 350—269 X |

DAVID SCHONBERG, *Primary Examiner.*

P. R. GILLIAM, *Assistant Examiner.*

U.S. Cl. X.R.

178—7.6; 350—7